(12) United States Patent
Sato et al.

(10) Patent No.: US 8,922,630 B2
(45) Date of Patent: *Dec. 30, 2014

(54) PROJECTOR DISCHARGE LAMP CURRENT CONTROLLER WITH A FOUR TIME SLOT PERIOD

(75) Inventors: Shun Sato, Shiojiri (JP); Tetsuo Terashima, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 374 days.

This patent is subject to a terminal disclaimer.

(21) Appl. No.: 13/191,764

(22) Filed: Jul. 27, 2011

(65) Prior Publication Data

US 2012/0038755 A1    Feb. 16, 2012

(30) Foreign Application Priority Data

Aug. 10, 2010  (JP) ................. 2010-179386

(51) Int. Cl.
| | |
|---|---|
| H04N 13/04 | (2006.01) |
| H04N 9/31 | (2006.01) |
| H05B 41/00 | (2006.01) |
| H05B 41/288 | (2006.01) |
| H05B 41/292 | (2006.01) |
| G09G 3/00 | (2006.01) |
| G09G 3/34 | (2006.01) |

(52) U.S. Cl.
CPC ......... H04N 13/0438 (2013.01); H04N 9/3197 (2013.01); H04N 13/0459 (2013.01); H04N 13/0497 (2013.01); H05B 41/00 (2013.01); H05B 41/2887 (2013.01); H05B 41/2928 (2013.01); G09G 3/003 (2013.01); G09G 3/3406 (2013.01); Y02B 20/202 (2013.01)
USPC .......................................... 348/55

(58) Field of Classification Search
CPC .  G09G 3/3406; G09G 3/003; H04N 13/0438; H04N 13/0459; H04N 13/0497
USPC .............. 348/55, 7; 353/7; 315/276, 307, 289
See application file for complete search history.

(56) References Cited

U.S. PATENT DOCUMENTS

| | | | |
|---|---|---|---|
| 7,138,769 B2* | 11/2006 | Suzuki et al. | ......... 315/289 |
| 8,506,092 B2* | 8/2013 | Sato et al. | ......... 353/85 |
| 2007/0164688 A1* | 7/2007 | Fukuda et al. | ......... 315/291 |

(Continued)

FOREIGN PATENT DOCUMENTS

| | | |
|---|---|---|
| CN | 101114116 A | 1/2008 |
| CN | 101336033 A | 12/2008 |
| JP | A-2003-102030 | 4/2003 |
| JP | A-2009-237302 | 10/2009 |

*Primary Examiner* — Richard Torrente
*Assistant Examiner* — Joseph Suh
(74) *Attorney, Agent, or Firm* — Oliff PLC

(57) ABSTRACT

A projector includes a discharge lamp, a discharge lamp driver that supplies the discharge lamp with a current, and a controller that controls the discharge lamp driver. The controller controls the discharge lamp driver in such a way that the absolute magnitude of the current is relatively small in the first period and relatively large in the second period. In the second period, the controller carries out a second-period AC control process in which an AC current is supplied to the discharge lamp. In the first period, the controller carries out a first-period control process in which in a third period, the absolute magnitude of the current becomes a minimum in the first period and in a fourth period, the absolute magnitude of the current becomes an intermediate value between the minimum and a maximum absolute magnitude of the current in the second period.

7 Claims, 9 Drawing Sheets

(56) References Cited

U.S. PATENT DOCUMENTS

| | | |
|---|---|---|
| 2008/0024853 A1 | 1/2008 | Tanaka et al. |
| 2008/0122380 A1* | 5/2008 | Matsui et al. .................. 315/276 |
| 2009/0001904 A1 | 1/2009 | Okawa |
| 2009/0237009 A1* | 9/2009 | Okawa et al. ................. 315/307 |
| 2010/0013400 A1* | 1/2010 | Honsberg-Riedl et al. ... 315/246 |
| 2010/0091098 A1* | 4/2010 | Yoshifuji et al. ................ 348/54 |
| 2010/0270938 A1* | 10/2010 | Matsuzaki ..................... 315/224 |
| 2011/0273098 A1* | 11/2011 | Grajcar ......................... 315/186 |
| 2012/0026468 A1* | 2/2012 | Terashima et al. ................ 353/7 |
| 2012/0038755 A1* | 2/2012 | Sato et al. ....................... 348/55 |

\* cited by examiner

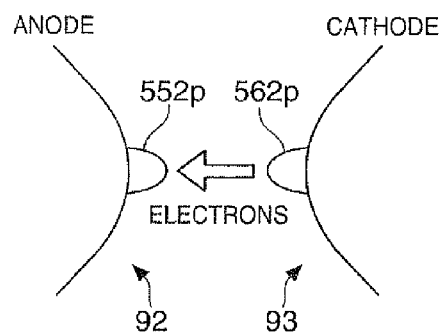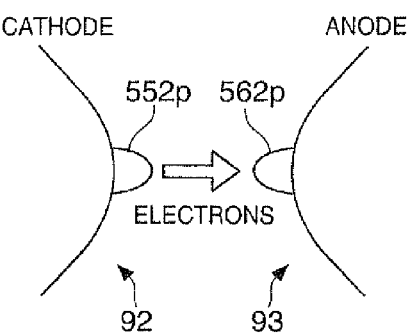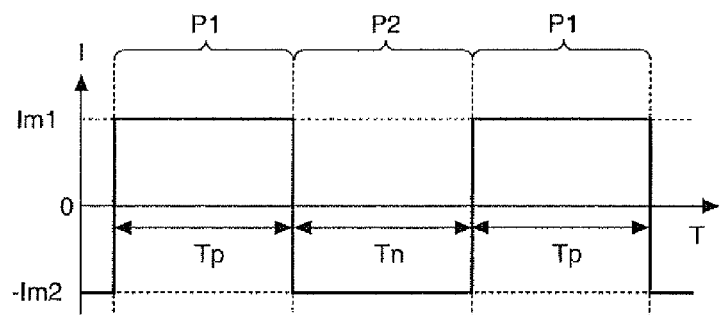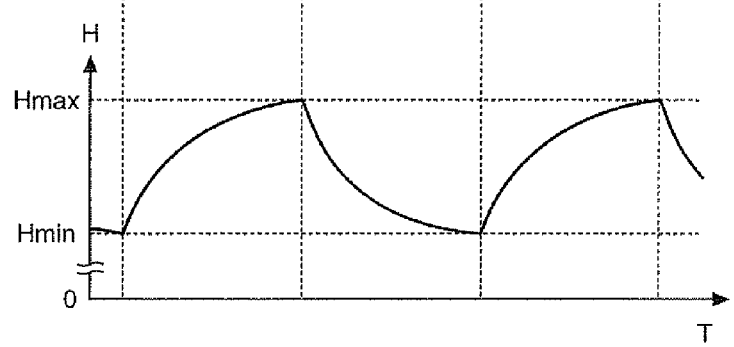

PROJECTOR DISCHARGE LAMP CURRENT CONTROLLER WITH A FOUR TIME SLOT PERIOD

BACKGROUND

1. Technical Field

The present invention relates to a projector.

2. Related Art

Projectors using a high-pressure mercury lamp, a metal halide lamp, or any other suitable discharge lamp have been in practical use. For example, JP-A-2003-102030 discloses a projector having a mechanism for changing the intensity of the light from a light source in accordance with the color selected by a color separation system or any other suitable mechanism and in synchronization with a video signal. JP-A-2009-237302, however, describes that simply changing the intensity of the light from a light source disadvantageously accelerates wear of the electrodes of a discharge lamp.

Further, projectors using a high-pressure mercury lamp, a metal halide lamp, or any other suitable discharge lamp to output stereoscopic video images have recently been brought into practical use.

To output stereoscopic video images, for example, video images for the right and left eyes are switched therebetween and alternately outputted (for example, a method called "XPAND beyond cinema (trademark of X6D Limited)" and other methods based on active shutter eyeglasses). In this method, active shutter eyeglasses or any other device synchronized with a video signal allows a wearer to view right-eye video images with the right eye and left-eye video images with the left eye, whereby the wearer can view the video images stereoscopically with the aid of parallax between the right and left eyes.

When stereoscopic video images are projected by using a method for alternately outputting right-eye video images and left-eye video images, the amount of light incident on the right and left eyes becomes halved or even smaller than a case where planar video images (two-dimensional video images) are projected in related art. Further, if the right-eye video images enters the left eye and the left-eye video images enters the right eye, or crosstalk occurs, the viewer will not view the video images with a sense of three-dimensionality any more. In this case, it is necessary to provide a period during which both the active shutters are closed. As a result, when stereoscopic video images are projected by using a method for alternately outputting right-eye video images and left-eye video images, the video images disadvantageously appear darker than a case where planar video images are projected in related art. To make the video images appear brighter, it is conceivable to simply increase drive electric power. In this case, however, power consumption of the projector disadvantageously increases, and the increase in drive electric power accelerates degradation of peripheral parts and causes other problems.

SUMMARY

An advantage of some aspects of the invention is to provide a projector capable of making projected stereoscopic video images appear bright while reducing the amount of wear of electrodes of a discharge lamp.

A projector according to an aspect of the invention switches video images between right-eye and left-eye video images at predetermined switching timings and alternately outputs the right-eye and left-eye video images. The projector includes: a discharge lamp, a discharge lamp driver that supplies the discharge lamp with a drive current for driving the discharge lamp, and a controller that controls the discharge lamp driver. A period sandwiched between temporally adjacent ones of the switching timings starts with a first period and ends with a second period, and the first period starts with a third period and ends with a fourth period. The controller controls the discharge lamp driver in such a way that an absolute magnitude of the drive current is relatively small in the first period and relatively large in the second periods. In the second period, the controller carries out a second-period AC control process in which the discharge lamp driver is controlled to supply an AC current as the drive current to the discharge lamp, and in the first period, the controller carries out a first-period control process in which the discharge lamp driver is so controlled that in the third period, the absolute magnitude of the drive current becomes a minimum in the first period and in the fourth period, the absolute magnitude of the drive current becomes an intermediate value between the minimum and a maximum absolute magnitude of the drive current in the second period.

According to the above aspect of the invention, since the controller controls the discharge lamp driver in such a way that the absolute magnitude of the drive current is relatively small in the first period and relatively large in the second period, the projector can make projected stereoscopic video images appear bright.

Further, according to the above aspect of the invention, since the controller carries out the second-period AC control process, in which the discharge lamp driver is controlled to supply an AC current as the drive current to the discharge lamp, in the second period, the amount of wear of electrodes of the discharge lamp can be reduced.

Further, according to the above aspect of the invention, since the controller carries out the first-period control process in the first period, in which in the third period, the absolute magnitude of the drive current becomes a minimum in the first period and in the fourth period, the absolute magnitude of the drive current becomes an intermediate value between the minimum described above and a maximum absolute magnitude of the drive current in the second period, the period during which the temperatures of the electrodes of the discharge lamp remain low can be shortened. The amount of wear of the electrodes of the discharge lamp can be further reduced.

In the projector, the controller may control the discharge lamp driver in the first-period control process in such a way that the absolute magnitude of the drive current becomes the minimum at a start point of the third period.

The amount of crosstalk can thus be further reduced.

In the projector, in the first-period control process, the controller may carry out a first-period AC control process in which the discharge lamp driver is controlled to supply an AC current as the drive current to the discharge lamp.

Flickering will therefore not occur in the first period, in which the temperatures of the electrodes of the discharge lamp become low. Further, preventing flickering allows the discharge start position to be stabilized and hence prevents protrusions of the electrodes from deforming when the temperatures of the electrodes become relatively low.

In the projector, the controller may control the discharge lamp driver in the first-period AC control process to supply the discharge lamp with an AC current having a frequency higher than the frequency of the AC current in the second-period AC control process.

Flickering will therefore not occur in the first period, in which the temperatures of the electrodes of the discharge lamp become low. Further, preventing flickering allows the discharge start position to be stabilized and hence prevents the protrusions of the electrodes from deforming when the temperatures of the electrodes become relatively low.

In the projector, the controller may change the absolute magnitude of the drive current in the first-period AC control process at a timing apart from a start point of the first period by an integral multiple of one cycle of the drive current.

The thermal load can thus be balanced between the electrodes of the discharge lamp. Unbalanced wear of the electrodes of the discharge lamp can therefore be suppressed.

In the projector, in the first-period control process, the controller may carry out a first-period DC control process in which the discharge lamp driver is controlled to supply the discharge lamp with a DC current as the drive current, and in the first-period DC control process, the discharge lamp driver is controlled to supply the discharge lamp with DC currents having opposite polarities as the drive current, one in the first period and the other in the temporally next first period with the second period therebetween.

The thermal load can thus be balanced between the electrodes of the discharge lamp. Unbalanced wear of the electrodes of the discharge lamp can therefore be suppressed.

BRIEF DESCRIPTION OF THE DRAWINGS

The invention will be described with reference to the accompanying drawings, wherein like numbers reference like elements.

FIGS. 6A to 6D describe the relationship between the polarity of a drive current I supplied to a discharge lamp and the temperatures of electrodes thereof.

DESCRIPTION OF EXEMPLARY EMBODIMENTS

A preferred embodiment of the invention will be described below in detail with reference to the drawings. The embodiment described below is not intended to inappropriately limit the contents of the invention set forth in the claims. Further, all the components described below are not necessarily essential in the invention.

1. Projector According to Present Embodiment
1-1. Optical System of Projector

Figure 1:
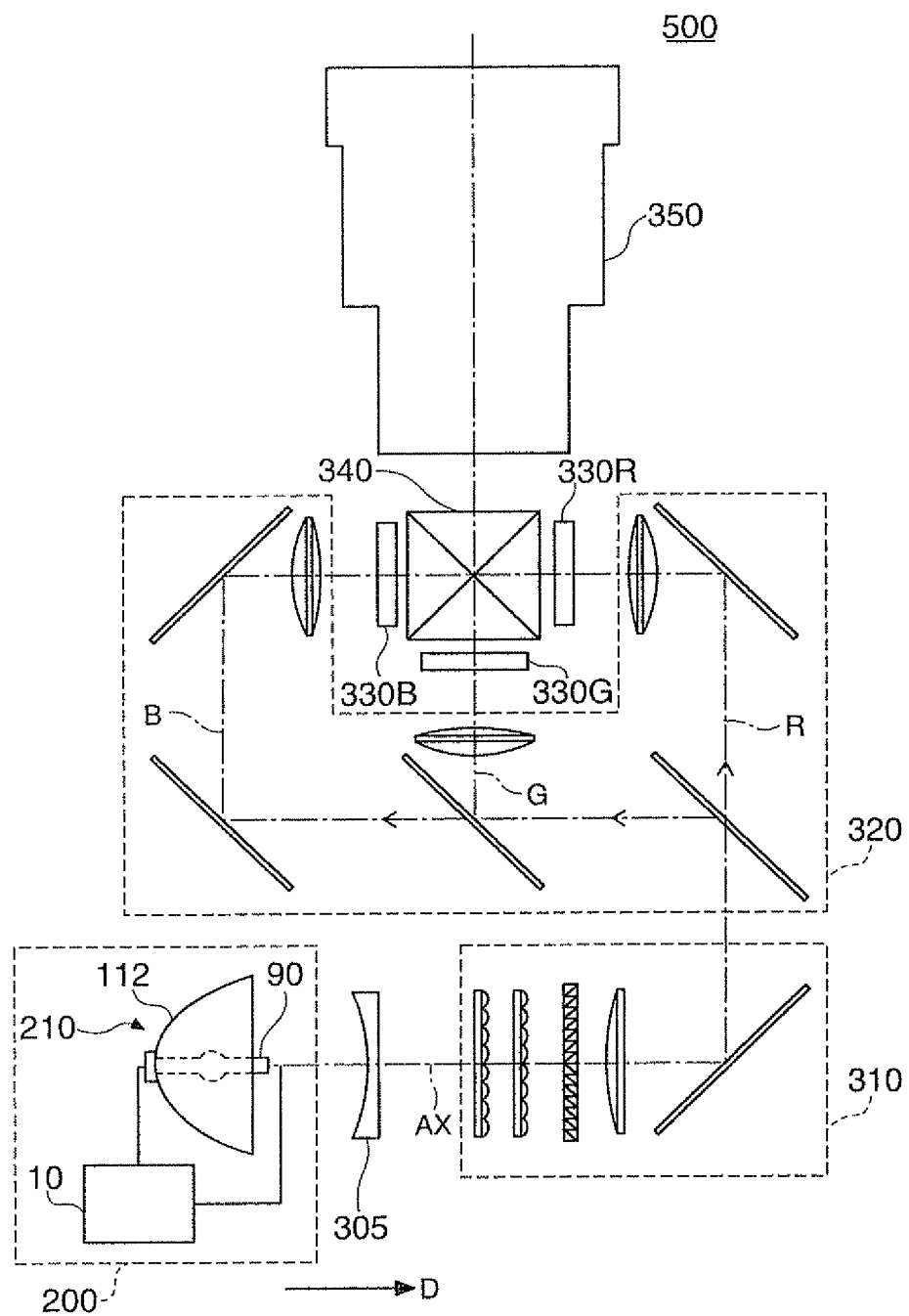
FIG. 1 describes an optical system of a projector according to an embodiment.

FIG. 1 describes an optical system of a projector 500 according to the present embodiment. The projector 500 includes a light source apparatus 200, a parallelizing lens 305, an illumination system 310, a color separation system 320, three liquid crystal light valves 330R, 330G, and 330B, a cross dichroic prism 340, and a projection system 350.

The light source apparatus 200 includes a light source unit 210 and a discharge lamp activating apparatus 10. The light source unit 210 includes a primary reflector 112, a secondary reflector 50 (which will be described later), and a discharge lamp 90. The discharge lamp activating apparatus 10 supplies electric power to the discharge lamp 90 to turn on the discharge lamp 90. The primary reflector 112 reflects light emitted from the discharge lamp 90 in an irradiation direction D. The irradiation direction D is parallel to an optical axis AX. The light from the light source unit 210 passes through the parallelizing lens 305 and enters the illumination system 310. The parallelizing lens 305 parallelizes the light from the light source unit 210.

The illumination system 310, through which the light from the light source apparatus 200 passes, homogenizes the illuminance of the light in the liquid crystal light valves 330R, 330G, and 330B. The illumination system 310 further aligns polarization directions of the light fluxes that form the light from the light source apparatus 200. The reason for this is to effectively use the light from the light source apparatus 200 in the liquid crystal light valves 330R, 330G, and 330B. The light having its illuminance distribution and polarization direction adjusted enters the color separation system 320. The color separation system 320 separates the light incident thereon into red (R), green (G), and blue (B) three color light fluxes. The three color light fluxes are modulated by the liquid crystal light valves 330R, 330G, and 330B, which correspond to the respective RGB colors. The liquid crystal light valves 330R, 330G, and 330B include liquid crystal panels 560R, 560G, and 560E, (which will be described later) and polarizers (not shown) disposed on the light-incident side and the light-exiting side of the liquid crystal panels 560R, 560G, and 560B. The modulated three color light fluxes are combined by the cross dichroic prism 340. The combined light then enters the projection system 350. The projection system 350 projects the incident light on a screen (not shown). An image is thus displayed on the screen.

The parallelizing lens 305, the illumination system 310, the color separation system 320, the cross dichroic prism 340, and the projection system 350 can be configured in a variety of known ways.

Figure 2:
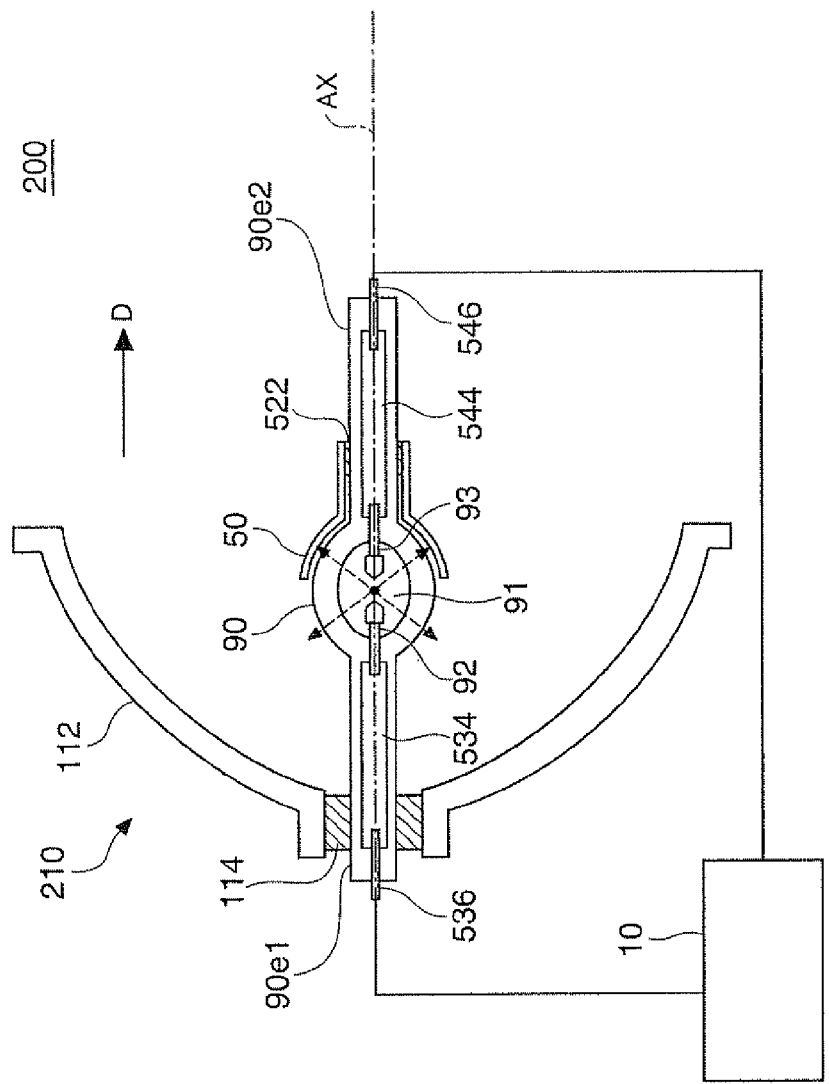
FIG. 2 describes the configuration of a light source apparatus.

FIG. 2 describes the configuration of the light source apparatus 200. The light source apparatus 200 includes the light source unit 210 and the discharge lamp activating apparatus 10. FIG. 2 shows a cross section of the light source unit 210. The light source unit 210 includes the primary reflector 112, the discharge lamp 90, and the secondary reflector 50.

The discharge lamp 90 has a rod-like shape extending from a first end 90e1 to a second end 90e2 along the irradiation direction D. The discharge lamp 90 is made of quartz glass or any other suitable light-transmissive material. A central portion of the discharge lamp 90 has a spherically swelled shape, and a discharge space 91 is formed in the central portion. The discharge space 91 has a gas sealed therein, and the gasworks as a discharge medium containing a rare gas, a metal halide, and other substances.

In the discharge space 91, a first electrode 92 and a second electrode 93 protrude from side portions of the discharge lamp 90. In the discharge space 91, the first electrode 92 is disposed close to the first end 90e1 and the second electrode 93 is disposed close to the second end 90e2. Each of the first electrode 92 and the second electrode 93 has a rod-like shape extending along the optical axis AX. In the discharge space 91, electrode front portions (also called "discharge ends") of the first electrode 92 and the second electrode 93 face each other with a predetermined distance therebetween. The first electrode 92 and the second electrode 93 are made of tungsten or any other suitable metal.

The first end 90e1 of the discharge lamp 90 has a first terminal 536 provided therein. The first terminal 536 is electrically connected to the first electrode 92 with a conductive member 534 extending along the inner space of the discharge lamp 90. The second end 90e2 of the discharge lamp 90 similarly has a second terminal 546 provided therein. The second terminal 546 is electrically connected to the second electrode 93 with a conductive member 544 extending along the inner space of the discharge lamp 90. The first terminal 536 and the second terminal 546 are made of tungsten or any other suitable metal. Each of the conductive members 534 and 544 is formed, for example, of a molybdenum foil.

The first terminal 536 and the second terminal 546 are connected to the discharge lamp activating apparatus 10. The discharge lamp activating apparatus 10 supplies a drive current for driving the discharge lamp 90 to the first terminal 536 and the second terminal 546. As a result, arc discharge is induced between the first electrode 92 and the second electrode 93. Light produced by the arc discharge (discharge light) is irradiated omnidirectionally from the discharge position, as indicated by the broken arrows.

The primary reflector 112 is fixed to the first end 90e1 of the discharge lamp 90 with a fixing member 114. The reflection surface of the primary reflector 112 (the surface facing the discharge lamp 90) has a spheroidal shape. The primary reflector 112 reflects the discharge light in the irradiation direction D. The reflection surface of the primary reflector 112 does not necessarily have a spheroidal shape but can have a variety of other shapes that reflect the discharge light in the irradiation direction D. For example, the reflection surface may have a paraboloidal shape. In this case, the primary reflector 112 can convert the discharge light into light substantially parallel to the optical axis AX, and the parallelizing lens 305 can therefore be omitted.

The secondary reflector 50 is fixed to the discharge lamp 90 with a fixing member 522 in a position close to the second end 90e2. The reflection surface of the secondary reflector 50 (the surface facing the discharge lamp 90) has a spherical shape surrounding the portion of the discharge space 91 that faces the second end 90e2. The secondary reflector 50 reflects the discharge light toward the primary reflector 112, whereby the efficiency representing how much the light irradiated from the discharge space 91 is used can be increased.

The fixing members 114, 522 can be made of an arbitrary heat-resistant material (inorganic adhesive, for example) that withstands heat generated by the discharge lamp 90. The primary reflector 112 and the secondary reflector 50 are not necessarily fixed to the discharge lamp 90, but the positional relationship among the primary reflector 112, the secondary reflector 50, and the discharge lamp 90 can be fixed in other arbitrary ways. For example, the discharge lamp 90 and the primary reflector 112 may be separately fixed to a housing (not shown) of the projector, and so may be the secondary reflector 50.

1-2. Circuit Configuration of Projector

Figure 3:
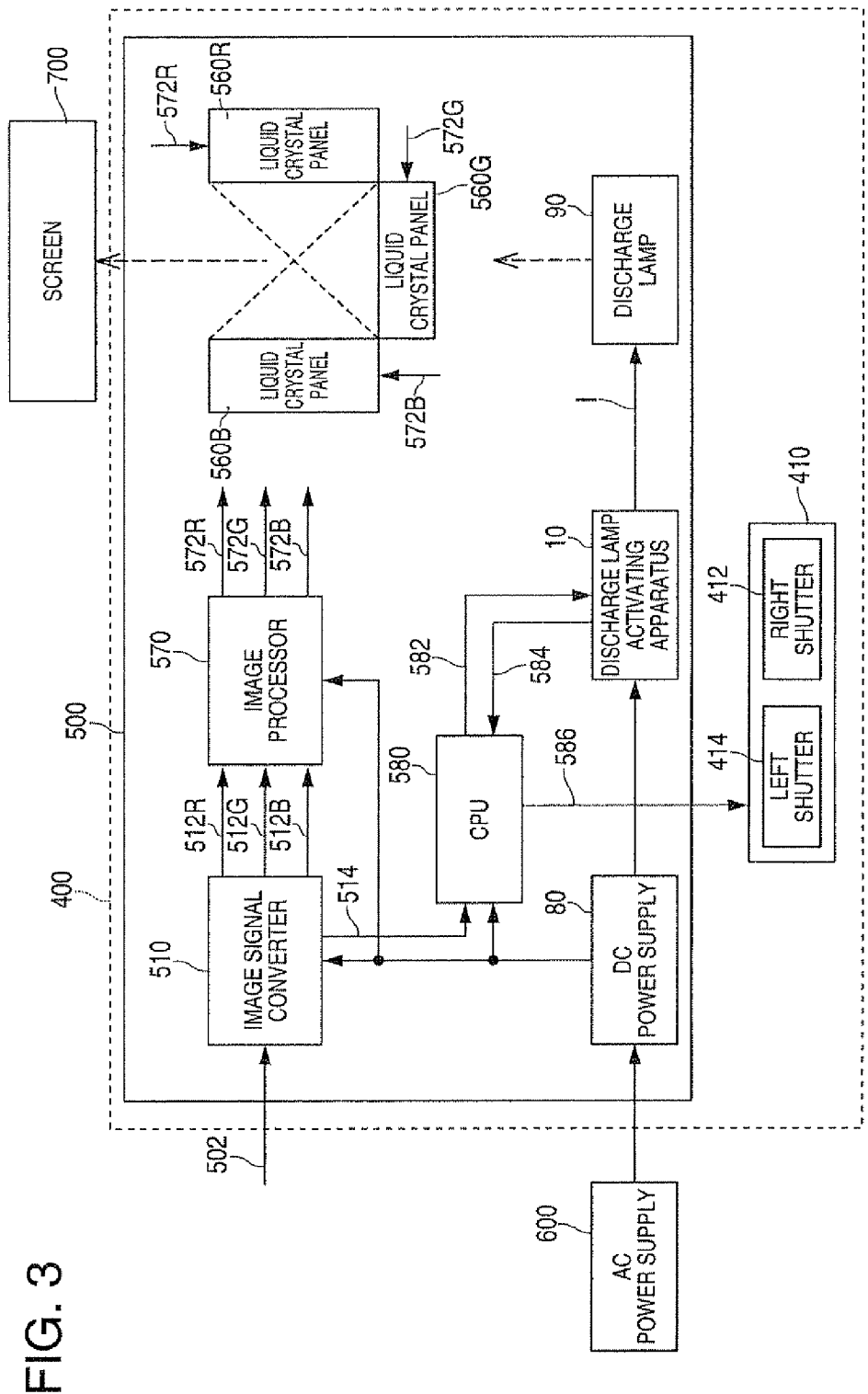
FIG. 3 shows an exemplary circuit configuration of the projector according to the present embodiment.

FIG. 3 shows an exemplary circuit configuration of the projector according to the present embodiment. The projector 500 may include an image signal converter 510, a DC power supply 80, the discharge lamp activating apparatus 10, the discharge lamp 90, the liquid crystal panels 560R, 560G, and 560B, an image processor 570, and a CPU (central processing unit) 580 as well as the optical system described above. It is also possible to configure a projector system 400 including the projector 500 and active shutter eyeglasses 410.

The image signal converter 510 converts an externally inputted image signal 502 (such as a luminance-chrominance signal and an analog RGB signal) into a digital RGB signal having a predetermined word length to produce image signals 512R, 512G, and 512E and supplies them to the image processor 570. The image signal converter 510, when receiving an image signal 502 carrying stereoscopic video image signal based on which right-eye video images and left-eye video images are alternately switched at predetermined switching timings, supplies a sync signal 514 to the CPU 580 based on the switching timings between the right-eye video images and the left-eye video images.

The image processor 570 performs image processing on the three image signals 512R, 512G, and 512B and supplies drive signals 572R, 572G, and 572B for driving the liquid crystal panels 560R, 560G, and 560B to the liquid crystal panels 560R, 560G, and 560B.

The DC power supply 80 converts an AC voltage supplied from an external AC power supply 600 into a constant DC voltage and supplies the DC voltage not only to the image signal converter 510 and the image processor 570, which are disposed on the secondary side of a transformer (accommodated in the DC power supply 80 but not shown), but also to the discharge lamp activating apparatus 10, which is disposed on the primary side of the transformer.

The discharge lamp activating apparatus 10 produces a high voltage between the electrodes of the discharge lamp 90 at the time of activation so that dielectric breakdown occurs and a discharge path is formed. Thereafter, the discharge lamp activating apparatus 10 supplies a drive current I for maintaining the discharge in the discharge lamp 90.

The liquid crystal panels 560R, 560G, and 560B modulate the luminance of the color light fluxes incident on the liquid crystal panels through the optical system described above based on the drive signals 572R, 572G, and 572B, respectively.

The CPU 580 controls actions of the projector, starting from an activating action to a deactivating action. For example, the CPU 580 may output an activating instruction and a deactivating instruction to the discharge lamp activating apparatus 10 by using a communication signal 582. The CPU 580 may also receive activation information representing whether the discharge lamp 90 is turned on from the discharge lamp activating apparatus 10 by using a communication signal 584. The CPU 580 may further output a control signal 586 for controlling the active shutter eyeglasses 410 based on the sync signal 514 and in synchronization with the image signal 502 by using wired or wireless communication.

The active shutter eyeglasses 410 may include a right shutter 412 and a left shutter 414. The right shutter 412 and the left shutter 414 are opened and closed based on the control signal 586. When a user wears the active shutter eyeglasses 410, closing the right shutter 412 can block the right field of view. Similarly, when the user wears the active shutter eyeglasses 410, closing the left shutter 414 can block the left field of view. Each of the right shutter 412 and the left shutter 414 may, for example, be a liquid crystal shutter.

1-3. Configuration of Discharge Lamp Activating Apparatus

Figure 4:
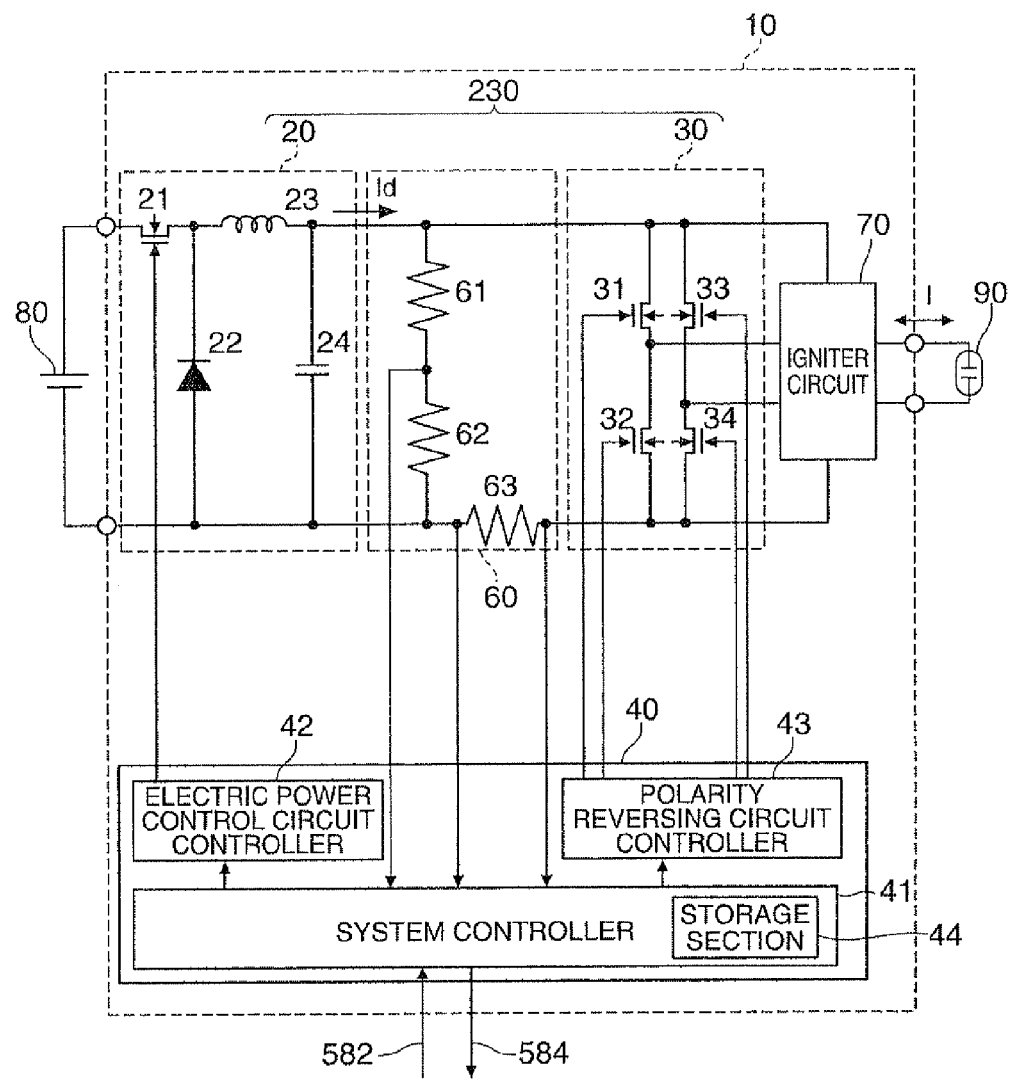
FIG. 4 shows an exemplary circuit configuration of a discharge lamp activating apparatus.

FIG. 4 shows an exemplary circuit configuration of the discharge lamp activating apparatus 10.

The discharge lamp activating apparatus 10 includes an electric power control circuit 20. The electric power control circuit 20 produces drive electric power to be supplied to the discharge lamp 90. In the present embodiment, the electric power control circuit 20 is configured as a step-down chopper circuit that receives an input from the DC power supply 80, steps down the input voltage, and outputs a DC current Id.

The electric power control circuit 20 can be formed of a switching device 21, a diode 22, a coil 23, and a capacitor 24. The switching device 21 can, for example, be a transistor. In the present embodiment, the switching device 21 has one end connected to a positive voltage side of the DC power supply 80 and the other end connected to a cathode terminal of the diode 22, and one end of the coil 23. The other end of the coil 23 is connected to one end of the capacitor 24, and the other end of the capacitor 24 is connected to an anode terminal of the diode 22 and a negative voltage side of the DC power supply 80. A control terminal of the switching device 21 receives a current control signal as an input from a controller 40 (which will be described later) so that the switching device 21 is turned on and off. The current control signal may, for example, be a PWM (pulse width modulation) control signal.

When the switching device 21 is turned on, a current flows through the coil 23 and energy is accumulated therein. When the switching device 21 is turned off, the energy accumulated in the coil 23 is discharged along a path passing through the capacitor 24 and the diode 22. The resultant DC current Id has a value according to the period during which the switching device 21 is turned on.

The discharge lamp activating apparatus 10 further includes a polarity reversing circuit 30. The polarity reversing circuit 30 receives the DC current Id outputted from the electric power control circuit 20 and reverses the polarity of the DC current Id at predetermined timings to produce and output the drive current I, which can be a DC current maintained for controlled duration or an AC current of an arbitrary frequency. In the present embodiment, the polarity reversing circuit 30 is formed of an inverter bridge circuit (full-bridge circuit).

The polarity reversing circuit 30, for example, includes a first switching device 31, a second switching device 32, a third switching device 33, and a fourth switching device 34, each of which is formed of a transistor or any other suitable device. The first switching device 31 and the second switching device 32 serially connected to each other are connected in parallel to the third switching device 33 and the fourth switching device 34 serially connected each other. Control terminals of the first switching device 31, the second switching device 32, the third switching device 33, and the fourth switching device 34 receive polarity reversing control signals from the controller 40, and the first switching device 31, the second switching device 32, the third switching device 33, and the fourth switching device 34 are turned on and off based on the polarity reversing control signals.

The polarity reversing circuit 30 alternately reverses the polarity of the DC current Id outputted from the electric power control circuit 20 to produce the drive current I, which can be a DC current maintained for controlled duration or an AC current of a controlled frequency, by repeatedly turning on and off the set of the first switching device 31 and the fourth switching device 34 and the set of the second switching device 32 and the third switching device 33 in an alternate manner, and outputs the drive current I from a common connection point to which the first switching device 31 and the second switching device 32 are connected and a common connection point to which the third switching device 33 and the fourth switching device 34 are connected.

That is, when the first switching device 31 and the fourth switching device 34 are turned on, the second switching device 32 and the third switching device 33 are turned off, whereas when the first switching device 31 and the fourth switching device 34 are turned off, the second switching device 32 and the third switching device 33 are turned on. In this configuration, when the first switching device 31 and the fourth switching device 34 are turned on, the drive current I is so produced that it flows from one end of the capacitor 24 through the first switching device 31, the discharge lamp 90, and the fourth switching device 34 in this order. On the other hand, when the second switching device 32 and the third switching device 33 are turned on, the drive current I is so produced that it flows from the one end of the capacitor 24 through the third switching device 33, the discharge lamp 90, and the second switching device 32 in this order.

In the present embodiment, the combination of the electric power control circuit 20 and the polarity reversing circuit 30 corresponds to a discharge lamp driver 230. That is, the discharge lamp driver 230 supplies the drive current I for driving the discharge lamp 90 to the discharge lamp 90.

The discharge lamp activating apparatus 10 further includes the controller 40. The controller 40 controls the discharge lamp driver 230. In the example shown in FIG. 4, the controller 40 controls the electric power control circuit 20 and the polarity reversing circuit 30 to control a holding period during which the drive current I keeps having the same polarity, the magnitude of the drive current I, the frequency thereof, and other parameters. The controller 40 controls the polarity reversing circuit 30 to perform polarity reversing control in which the holding period during which the drive current I keeps having the same polarity, the frequency of the drive current I, and other parameters are controlled based on the timings at which the polarity of the drive current I is reversed. The controller 40 further controls the electric power control circuit 20 to perform current control in which the magnitude of the outputted DC current Id is controlled.

The controller 40 is not necessarily configured in a specific manner. In the present embodiment, the controller 40 is formed of a system controller 41, an electric power control circuit controller 42, and a polarity reversing circuit controller 43. The entire or part of the controller 40 may be formed of a semiconductor integrated circuit.

The system controller 41 controls the electric power control circuit controller 42 and the polarity reversing circuit controller 43 to control the electric power control circuit 20 and the polarity reversing circuit 30. The system controller 41 may control the electric power control circuit controller 42 and the polarity reversing circuit controller 43 based on a drive voltage Vla and the drive current I detected by an action detector 60, which is provided in the discharge lamp activating apparatus 10 and will be described later.

In the present embodiment, the system controller 41 includes a storage section 44. The storage section 44 may alternatively be provided separately from the system controller 41.

The system controller 41 may control the electric power control circuit 20 and the polarity reversing circuit 30 based on information stored in the storage section 44. The storage section 44 may store information on drive parameters, such as the holding period during which the drive current I keeps having the same polarity, the magnitude of the drive current I, the frequency thereof, the waveform thereof, and a modulation pattern.

The electric power control circuit controller 42 controls the electric power control circuit 20 by outputting the current control signal to the electric power control circuit 20 based on a control signal from the system controller 41.

The polarity reversing circuit controller 43 controls the polarity reversing circuit 30 by outputting the polarity reversing control signals to the polarity reversing circuit 30 based on a control signal from the system controller 41.

Figure 5:
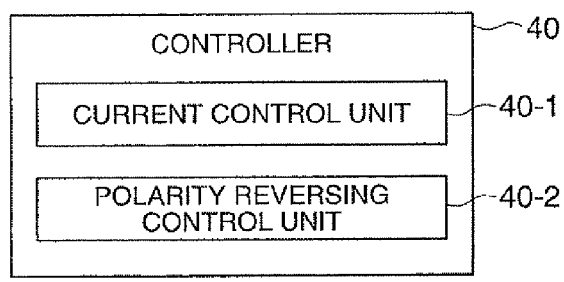
FIG. 5 describes another exemplary configuration of a controller.

To perform the control operations described above and a variety of other control operations described below, the controller 40 can be formed of a dedicated circuit or can alternatively function as a computer, for example, by using a CPU (central processing unit) to execute a control program stored in the storage section 44 or any other suitable device. FIG. 5 describes another example of the configuration of the controller 40. As shown in FIG. 5, the controller 40 may be configured to execute a control program and function as a current control unit 40-1 that controls the electric power control circuit 20 and a polarity reversing control unit 40-2 that controls the polarity reversing circuit 30.

Further, the controller 40 is configured to be part of the discharge lamp activating apparatus 10 in the example shown in FIG. 4, but the CPU 580 may alternatively be configured to provide part of the functions of the controller 40.

The discharge lamp activating apparatus 10 may further include the action detector 60. The action detector 60 may, for example, include a voltage detector that detects the drive voltage Vla for driving the discharge lamp 90 and outputs drive voltage information to the controller 40 and a current detector that detects the drive current I and outputs drive current information to the controller 40. In the present embodiment, the action detector 60 is formed of a first resistor 61, a second resistor 62, and a third resistor 63.

In the present embodiment, the voltage detector detects the drive voltage Vla based on a voltage obtained by the first resistor 61 and the second resistor 62, which are connected serially to each other and in parallel to the discharge lamp 90 and work as a voltage divider. Further, in the present embodiment, the current detector detects the drive current I based on a voltage induced across the third resistor 63 connected serially to the discharge lamp 90.

The discharge lamp activating apparatus 10 may further include an igniter circuit 70. The igniter circuit 70 operates only when the discharge lamp 90 is activated. In operation, the igniter circuit 70 supplies such a high voltage (higher than a voltage typically necessary to activate the discharge lamp 90) between the electrodes (between the first electrode 92 and the second electrode 93) of the discharge lamp 90 that dielectric breakdown occurs between the electrodes (between the first electrode 92 and the second electrode 93) of the discharge lamp 90 and a discharge path is formed at the time of activation of the discharge lamp 90. In the present embodiment, the igniter circuit 70 is connected in parallel to the discharge lamp 90.

1-4. Relationship between Polarity of Drive Current and Temperatures of Electrodes FIGS. 6A to 6D describe the relationship between the polarity of the drive current I supplied to the discharge lamp 90 and the temperatures of the electrodes thereof. FIGS. 6A and 6B show the first electrode 92 and the second electrode 93 in operation and front portions thereof. The front portions of the first electrode 92 and the second electrode 93 have protrusions 552$p$ and 562$p$. Discharge induced between the first electrode 92 and the second electrode 93 occurs primarily between the protrusions 552$p$ and 562$p$. In the present embodiment, the discharge position (arc position) shifts less between the first electrode 92 and the second electrode 93 than in a case where no protrusions are provided. The protrusions may alternatively be omitted.

FIG. 6A shows a first polarity state P1 in which the first electrode 92 acts as an anode and the second electrode 93 acts as a cathode. In the first polarity state P1, discharge causes electrons to move from the second electrode 93 (cathode) to the first electrode 92 (anode). The cathode (second electrode 93) emits electrons. The electrons emitted from the cathode (second electrode 93) collide with the front portion of the anode (first electrode 92). The collision generates heat, which increases the temperature of the front portion (protrusion 552$p$) of the anode (first electrode 92)

FIG. 6B shows a second polarity state P2 in which the first electrode 92 acts as the cathode and the second electrode 93 acts as the anode. In the second polarity state P2, electrons conversely move from the first electrode 92 to the second electrode 93, unlike in the first polarity state P1. As a result, the temperature of the front portion (protrusion 562$p$) of the second electrode 93 increases.

As described above, the temperature of the anode tends to be higher than that of the cathode. When the temperature of one of the electrodes is kept higher than that of the other, a variety of problems can occur. For example, when the front portion of the high-temperature electrode melts excessively, the electrode may deform in an unintended manner. As a result, the arc length may shift from an appropriate value in some cases. Further, when the front portion of the low-temperature electrode melts insufficiently, minute unmelted irregularities may be left in the front portion. As a result, what is called an arc jump may occur (the arc position is not stable but moves) in some cases.

To solve the problems described above, an AC driving technique can be used to repeatedly switch the polarities of the electrodes. FIG. 6C shows a timing chart illustrating an example of the drive current I supplied to the discharge lamp 90 (FIG. 2). The horizontal axis represents time T, and the vertical axis represents the magnitude of the drive current I. The drive current I is the current flowing through the discharge lamp 90. The drive current I has a positive value in the first polarity state P1, whereas having a negative value in the second polarity state P2. In the example shown in FIG. 6C, a rectangular AC current is used as the drive current I. In the example shown in FIG. 6C, the first polarity state P1 and the second polarity state P2 are alternately repeated. A first polarity section Tp represents a period during which the first polarity state P1 continues, and a second polarity section Tn represents a period during which the second polarity state P2 continues. In the example shown in FIG. 6C, the average magnitude of the current is Im1 in each first polarity section Tp, and the average magnitude of the current is −Im2 in each second polarity section Tn. The frequency of the drive current I suitable for driving the discharge lamp 90 can be determined empirically in accordance with characteristics of the discharge lamp 90 (a value between 30 Hz and 1 kHz can be used, for example). Other values Im1, −Im2, Tp, and Tn can also be determined empirically.

FIG. 6D shows a timing chart illustrating change in the temperature of the first electrode 92. The horizontal axis represents the time T, and the vertical axis represents the temperature H. The temperature H of the first electrode 92 increases in each first polarity state P1, whereas decreasing in each second polarity state P2. Since the first polarity state Pi and the second polarity state P2 are repeated, the temperature H changes periodically between a minimum Hmin and a maximum Hmax. Although not shown, the temperature of the second electrode 93 changes in a way similar to the temperature H of the first electrode 92 but in an opposite phase. That is, the temperature of the second electrode 93 decreases in each first polarity state P1, whereas increasing in each second polarity state P2.

In the first polarity state P1, since the front portion of the first electrode 92 (protrusion 552$p$) melts and hence becomes smooth, the discharge position at the first electrode 92 will not move. Further, since the temperature of the front portion of the second electrode 93 (protrusion 562$p$) decreases, the second electrode 93 (protrusion 562$p$) will not melt excessively, whereby the electrode will not deform in an unintended manner. In the second polarity state P2, the first electrode 92 and the second electrode 93 behave the other way around. Repeating the two states P1 and P2 therefore solves the problems with the first electrode 92 and the second electrode 93 described above.

When the waveform of the current I is symmetric, that is, when the waveform of the current I satisfies the following conditions: "|Im1|=|−Im2| and Tp=Tn," the electric power is supplied to the first electrode 92 and the second electrode 93 in the same condition. The difference in temperature between the first electrode 92 and the second electrode 93 is therefore estimated to be small when thermal conditions of the first electrode 92 and the second electrode 93 (how readily the temperatures of the electrodes increase or decrease) are the same. When the thermal conditions of the first electrode 92 and the second electrode 93 differ from each other, the protrusion at the front portion of the electrode exposed to a condition where the temperature thereof readily becomes higher possibly melts away. If the protrusion at the front portion of the electrode melts away, the start point of the arc may become unstable and the electrode may further deform. Further, the front portion of the electrode exposed to a condition where the temperature thereof readily becomes higher may experience evaporation of its excessive material, which may adhere to a sealing body of the discharge lamp, resulting in possible blackening and needle crystal formation.

Further, when a wide area of either of the electrodes is excessively heated (when the size of the arc spot (hot spot formed on the surface of the electrode in association with arc discharge) increases), the electrode excessively melts and the shape thereof deforms. Conversely, when the electrode becomes too cold (when the size of the arc spot decreases), the front portion of the electrode melts insufficiently. In this case, the front portion will not return to a smooth state, that is, the front portion of the electrode tends to deform. As described above, when energy continues to be constantly supplied to the electrodes, the front portions (protrusions 552$p$ and 562$p$) of the electrodes tend to deform into unintended shapes.

1-5. Example of How to Control Drive Current

A description will next be made of a specific example of how to control the drive current I in the projector 500 according to the present embodiment.

Figure 7:
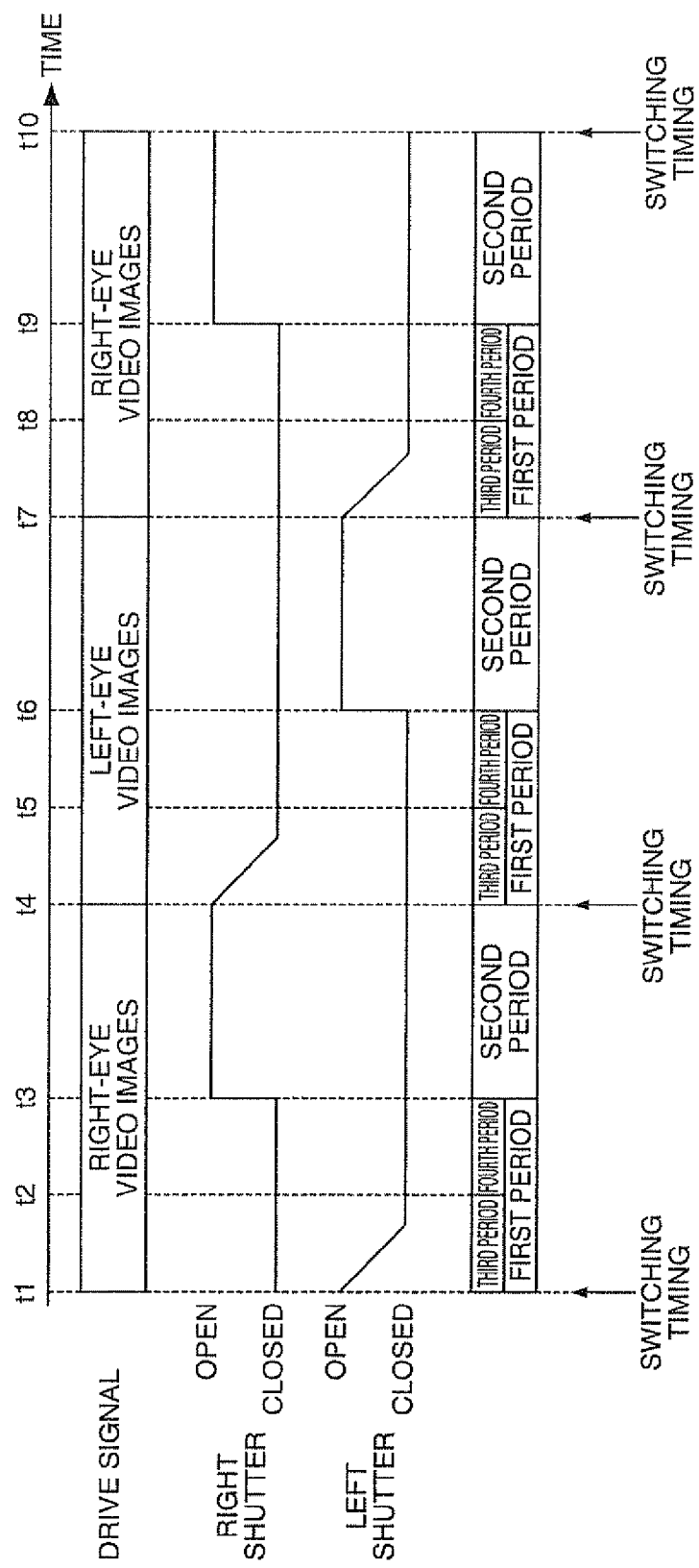
FIG. 7 describes a first period, a second period, a third period, a fourth period, and switching timings.

FIG. 7 describes a first period, a second period, a third period, a fourth period, and switching timings. FIG. 7 shows the relationship among the following items along the temporal axis: video images carried by the drive signals 572R, 572G, and 572B, the open/close state of the right shutter 412, the open/close state of the left shutter 414, the first to fourth periods, and the switching timings shown in this order from above to below. The horizontal axis in FIG. 7 represents time.

In the example shown in FIG. 7, the drive signals 572R, 572G, and 572B carry right-eye video images during the period from time t1 to time t4, left-eye video images during the period from time t4 to time t7, and right-eye video images during the period from time t7 to time t10. In the example shown in FIG. 7, the projector 500 therefore switches video images between right-eye and left-eye video images and alternately outputs them in accordance with the switching timings at the time t1, t4, t7, and t10.

The period sandwiched between temporally adjacent switching timings starts with a first period and ends with a second period. In the example shown in FIG. 7, the period sandwiched between the time t1 and the time t4, which are switching timings, for example, starts with the first period from the time t1 to the time t3 and ends with the second period from the time t3 to the time t4. The same holds for the period sandwiched between the time t4 and the time t7, which are switching timings, and the period sandwiched between the time t7 and the time t10, which are switching timings. In the example shown in FIG. 7, the length of the first period is equal to the length of the second period, but the lengths of the first and second periods can be appropriately set as required. Further, a fifth period may be present between the first and second periods. The drive current I may be controlled in the fifth period differently from the way in the first and second periods, which will be described later.

Each first period starts with a third period and ends with a fourth period. In the example shown in FIG. 7, the first period from the time t1 to the time t3 starts with the third period from the time t1 to the time t2 and ends with the fourth period from the time t2 to the time t3. The first period from the time t4 to the time t6 starts with the third period from the time t4 to the time t5 and ends with the fourth period from the time t5 to the time t6. Similarly, the first period from the time t7 to the time t9 starts with the third period from the time t7 to the time t8 and ends with the fourth period from the time t8 to the time t9. In the example shown in FIG. 7, the length of the third period is equal to the length of the fourth period, but the lengths of the third and fourth periods can be appropriately set as required.

The right shutter 412 is open in at least part of the period during which the drive signals 572R, 572G, and 572B carrying right-eye video images are inputted to the liquid crystal panels 560R, 560G, and 560B. In the example shown in FIG. 7, the right shutter 412 is closed from the time t1 to the time t3 and open from the time t3 to the time t4. In the example shown in FIG. 7, in the period during which the drive signals 572R, 572G, and 5723 carrying left-eye video images are inputted to the liquid crystal panels 560R, 560G, and 560B, the right shutter 412 starts being closed at the time t4, stops being closed in between the time t4 and the time t5, and remains closed from the time t5 to the time t7. The open/close state of the right shutter 412 from the time t7 to the time t10 changes in the same manner as the open/close state from the time t1 to the time t4 changes.

The left shutter 414 is open in at least part of the period during which the drive signals 572R, 572G, and 572B carrying left-eye video images are inputted to the liquid crystal panels 560R, 560G, and 560B. In the example shown in FIG. 7, the left shutter 414 is closed from the time t4 to the time t6 and open from the time t6 to the time t7. In the example shown in FIG. 7, in the period during which the drive signals 572R, 572G, and 572B carrying right-eye video images are inputted to the liquid crystal panels 560R, 560G, and 560B, the left shutter 414 starts being closed at the time t1, stops being closed in between the time t1 and the time t2, and remains closed from the time t2 to the time t4. The open/close state of the left shutter 414 from the time t7 to the time t10 changes in the same manner as the open/close state from the time t1 to the time t4 changes.

In the example shown in FIG. 7, in the period during which the drive signals 572R, 572G, and 572B carrying right-eye video images are inputted to the liquid crystal panels 560R, 560G, and 560B, the period during which the right shutter 412 is closed is the first period, and the period during which the right shutter 412 is open is the second period. Further, in the example shown in FIG. 7, in the period during which the drive signals 572R, 572G, and 572B carrying left-eye video images are inputted to the liquid crystal panels 560R, 560G, and 560B, the period during which the left shutter 414 is closed is the first period, and the period during which the left shutter 414 is open is the second period. Moreover, in the example shown in FIG. 7, both the right shutter 412 and the left shutter 414 are closed in the fourth period.

Figure 8:
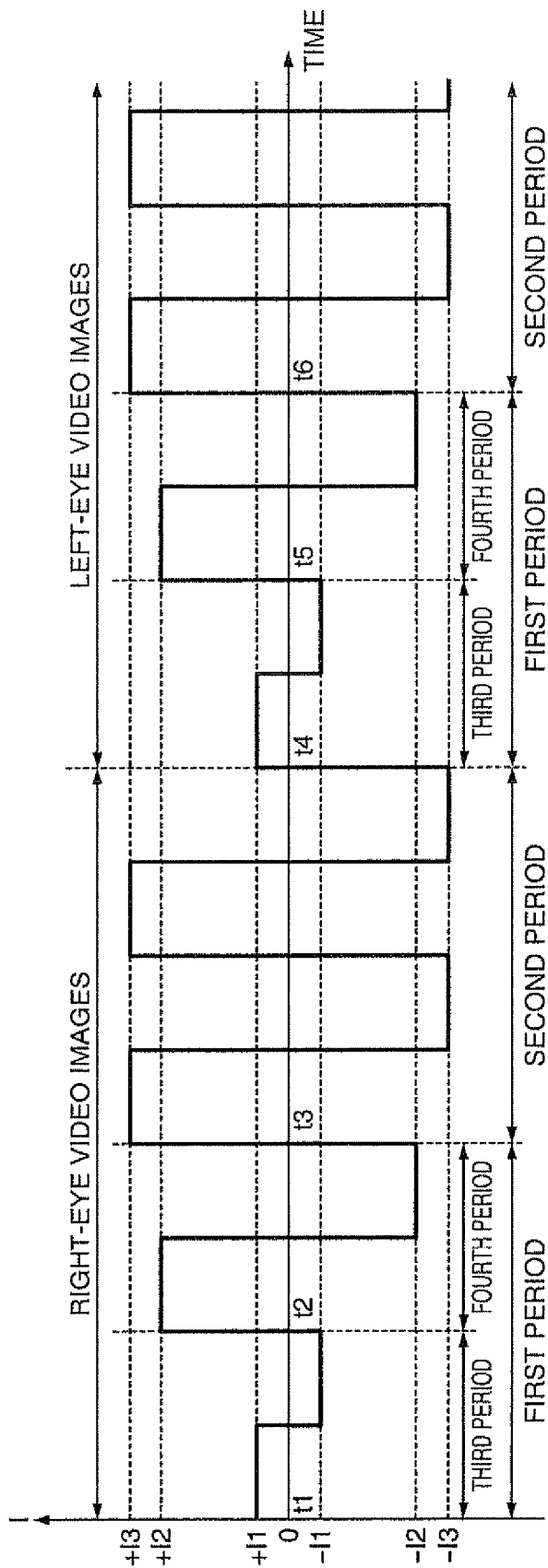
FIG. 8 shows a timing chart illustrating an example of the waveform of the drive current I in the present embodiment.

FIG. 8 shows a timing chart illustrating an example of the waveform of the drive current I in the present embodiment. The horizontal axis represents time, and the vertical axis represents the magnitude of the drive current I. In FIG. 8, the drive current I has a positive value when the second electrode 93 acts as the anode, whereas the drive current I has a negative value when the first electrode 92 acts as the anode. Further, in the following description, the drive current I is of positive polarity when the second electrode 93 acts as the anode, whereas the drive current I is of negative polarity when the first electrode 92 acts as the anode.

In the projector 500 according to the present embodiment, the controller 40 so controls the discharge lamp driver 230 that the absolute magnitude of the drive current I in each first period is smaller than that in each second period and the absolute magnitude of the drive current I in each second period is greater than that in each first period.

In the example shown in FIG. 8, the absolute magnitude of the drive current I is I1 in the third period from the time t1 to the time t2, I2 in the fourth period from the time t2 to the time t3, I3 in the second period from the time t3 to the time t4, I1 in the third period from the time t4 to the time t5, I2 in the fourth period from the time t5 to the time t6, and I3 in the secondperiod after the time t6. Further, in the example shown in FIG. 8, I1<I2<I3. The absolute magnitude of the drive current I is therefore relatively small in each first period whereas being relatively large in each second period.

In the example shown in FIG. 8, the absolute magnitude of the drive current I is fixed in each of the second, third, and fourth periods, but the absolute magnitude of the drive current I is not necessarily be fixed.

In the projector 500 according to the present embodiment, the controller 40 carries out a second-period AC control process in which the discharge lamp driver 230 is controlled to supply an AC current as the drive current I to the discharge lamp 90 in each second period.

In the second-period AC control process in the example shown in FIG. 8, the controller 40 so controls the discharge lamp driver 230 to supply an AC current as the drive current I to the discharge lamp 90 in the second period from the time t3 to the time t4 and the second period after the time t6. In the second-period AC control process in the example shown in FIG. 8, the controller 40 controls the discharge lamp driver 230 to produce an AC current corresponding to two cycles by reversing the polarity of the drive current I while keeping the absolute magnitude of the drive current I fixed in each second period and supply the produced AC current as the drive current I to the discharge lamp 90. The frequency of the drive current I in the second-period AC control process can be determined empirically in accordance with characteristics of the discharge lamp 90. For example, the frequency of the drive current I may be a value between 30 Hz and 1 kHz.

The controller 40 further carries out a first-period control process in which the discharge lamp driver 230 is so controlled that in each third period, the absolute magnitude of the drive current I becomes a minimum in each first period and in each fourth period, the absolute magnitude of the drive current I becomes an intermediate value between the minimum described above and a maximum absolute magnitude of the drive current I in each second period.

In the example shown in FIG. 8, the absolute magnitude I1 of the drive current I in each third period is the minimum in each first period. The maximum absolute magnitude of the drive current I in each second period is I3. In each fourth period, the absolute magnitude of the drive current I is I2, which is an intermediate value between I1, which is the (minimum) absolute magnitude of the drive current I in each third period, and I3, which is the maximum absolute magnitude of the drive current I in each second period. In the example shown in FIG. 8, the absolute magnitude of the drive current I changes between two values, I1 and I2, in each first period. Alternatively, for example, the first-period control process may be so carried out that the absolute magnitude of the drive current I changes between two or more intermediate values in the fourth period and hence changes as a whole among three or more values.

In the projector 500 according to the present embodiment, since the controller 40 so controls the discharge lamp driver 230 that the absolute magnitude of the drive current I decreases to the minimum in each first period whereas increasing to the maximum in each second period, driving the discharge lamp 90 with the average drive electric power over first and second periods fixed not only allows projected video images to be darker in each first period than in a case where the discharge lamp 90 is driven at the average drive electric power but also allows projected video images to be brighter in each second period than in a case where the discharge lamp 90 is driven at the average drive electric power. Since each first period has the period during which both the right shutter 412 and the left shutter 414 are closed, the quality of projected video images is unlikely affected even when they are dark. On the other hand, since either the right shutter 412 or the left shutter 414 is open in each second period, projected video images viewed by a user can be made brighter than in a case where the discharge lamp 90 is driven at the average drive electric power. The projector can therefore make projected stereoscopic video images appear bright. Further, the degree of crosstalk can be reduced by making projected video images dark in each first period.

Further, in the projector 500 according to the present embodiment, since the controller 40 carries out the second-period AC control process, in which the discharge lamp driver 230 is controlled to supply an AC current as the drive current I to the discharge lamp 90, in each second period, the amount of wear of the electrodes of the discharge lamp can be reduced.

Further, in the projector 500 according to the present embodiment, since the controller 40 carries out the first-period control process in each first period, in which in the third period, the absolute magnitude of the drive current becomes a minimum in the first period and in the fourth period, the absolute magnitude of the drive current becomes an intermediate value between the minimum described above and a maximum absolute magnitude of the drive current in the second period, the period during which the temperatures of the electrodes of the discharge lamp 90 remain low can be shortened. The amount of wear of the electrodes of the discharge lamp can therefore be further reduced.

Further, in the projector 500 according to the present embodiment, the controller 40 may control the discharge lamp driver 230 in the first-period control process in such a way that the absolute magnitude of the drive current I decreases to a minimum in the first period at the start point of the third period. In the example shown in FIG. 8, the absolute magnitude of the drive current I is I1, which is the minimum in each first period, at the time t1 and the time t4, which are the start points of the third periods.

The time of the start point of each third period coincides with a switching timing between right-eye video images and left-eye video images. The amount of crosstalk can therefore be further reduced by making projected video images dark at the start point of each third period.

Further, in the projector 500 according to the present embodiment, the controller 40 may carry out a first-period AC control process, which is part of the first-period control and in which the discharge lamp driver 230 is controlled to supply an AC current as the drive current I to the discharge lamp 90. In the example shown in FIG. 8, the drive current I is an AC current in each of the first and second periods. The frequency of the drive current I in the first-period AC control process can be determined empirically in accordance with characteristics of the discharge lamp 90. For example, the frequency of the drive current I may be a value between 30 Hz and 1 kHz.

In general, when the temperatures of the electrodes are low, flickering tends to occur. To prevent flickering, it is preferable to drive the discharge lamp 90 with an AC current instead of a DC current. Flickering will therefore not occur in each first period, in which the temperatures of the electrodes of the discharge lamp become low, by supplying an AC current as the drive current I to the discharge lamp 90 in each of the first and second periods. Further, preventing flickering allows the discharge start position to be stabilized and hence prevents the protrusions from deforming when the temperatures of the electrodes become relatively low.

Further, in the projector 500 according to the present embodiment, the controller 40 may change the absolute magnitude of the drive current I in the first-period AC control process at a timing apart from the start point of each first period by an integral multiple of one cycle of the drive current I. In the example shown in FIG. 8, the absolute magnitude of the drive current I is changed from I1 to I2 at the time t2, which is the timing apart from the time t1, which is the start point of the first period, by one cycle of the drive current I. Similarly, the absolute magnitude of the drive current I is changed from I1 to I2 at the time t5, which is the timing apart from the time t4, which is the start point of the following first period, by one cycle of the drive current I.

The first electrode 92 and the second electrode 93 of the discharge lamp 90 can thus receive thermal load in a symmetric manner, whereby the thermal load can be balanced between the first electrode 92 and the second electrode 93 of the discharge lamp 90. Unbalanced wear of the electrodes of the discharge lamp can therefore be suppressed.

1-6. Variation 1

Figure 9:
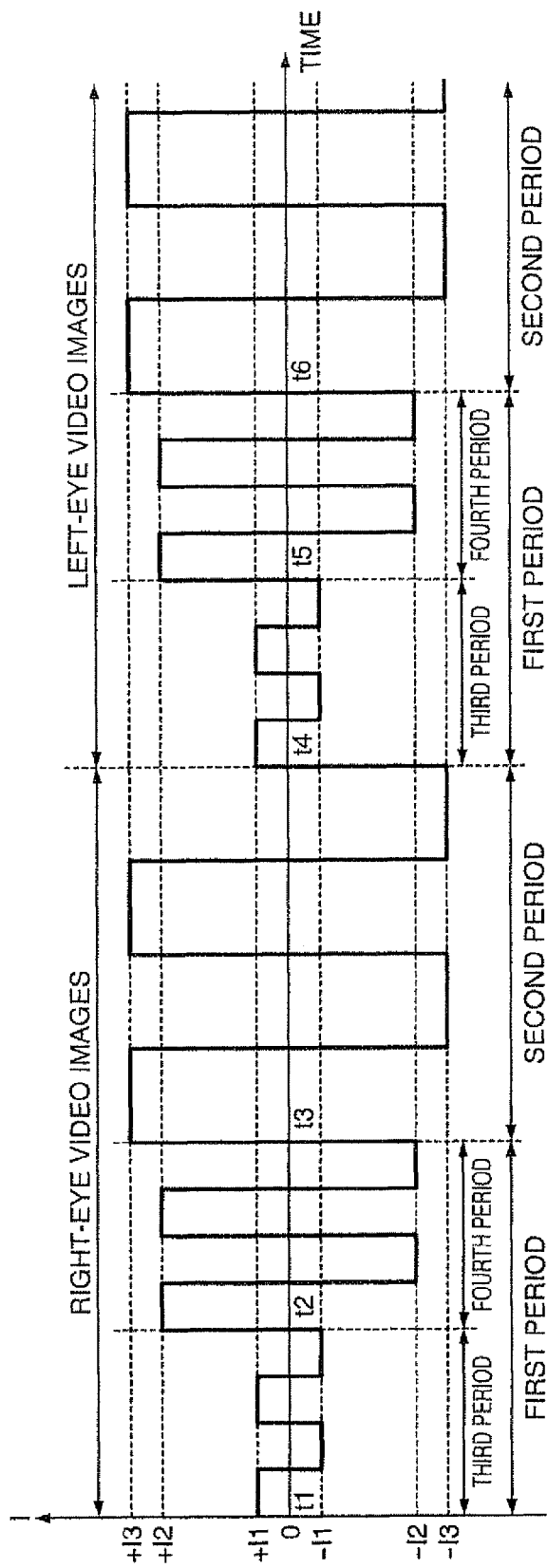
FIG. 9 shows a timing chart illustrating an example of the waveform of the drive current I in Variation 1 of the present embodiment.

FIG. 9 shows a timing chart illustrating an example of the waveform of the drive current I in Variation 1 of the present embodiment. The horizontal axis represents time, and the vertical axis represents the magnitude of the drive current I. In FIG. 9, the drive current I has a positive value when the second electrode 93 acts as the anode, whereas the drive current I has a negative value when the first electrode 92 acts as the anode.

The controller 40 may control the discharge lamp driver 230 in the first-period AC control process to supply the discharge lamp 90 with an AC current having a frequency higher than that of an AC current in the second-period AC control process. In the example shown in FIG. 9, the controller 40 controls the discharge lamp driver 230 in the first-period AC control process to supply the discharge lamp 90 with an AC current, as the drive current I, having a frequency twice the frequency of the drive current I supplied in the second-period AC control process.

In general, when the temperatures of the electrodes are low, the discharge start point between the electrodes can be stabilized by driving the discharge lamp with a high-frequency AC current. In the first-period AC control process, supplying the discharge lamp 90 with an AC current, as the drive current I, having a frequency higher than that of an AC current in the second-period AC control process further prevents flickering in each first period, in which the temperatures of the electrodes of the discharge lamp become low. Further, preventing flickering allows the discharge start position to be stabilized and hence prevents the protrusions from deforming when the temperatures of the electrodes become relatively low.

1-7. Variation 2

Figure 10:
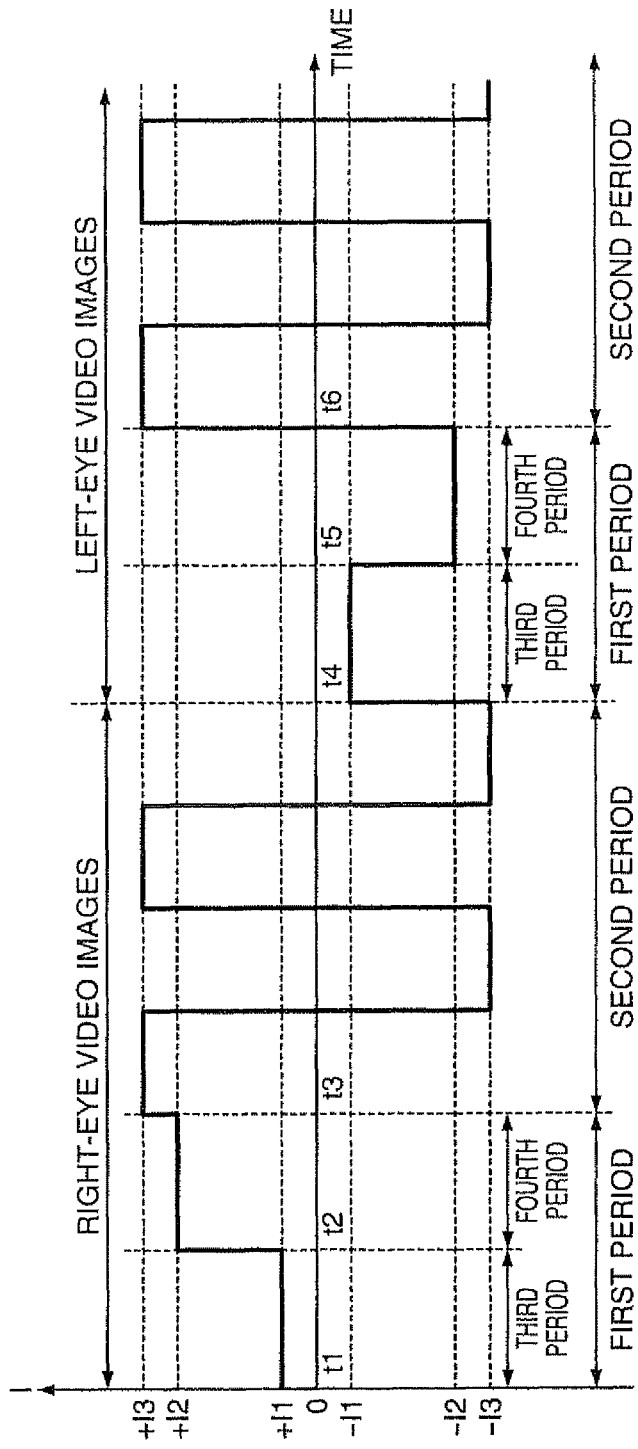
FIG. 10 shows a timing chart illustrating an example of the waveform of the drive current I in Variation 2 of the present embodiment.

FIG. 10 shows a timing chart illustrating an example of the waveform of the drive current I in Variation 2 of the present embodiment. The horizontal axis represents time, and the vertical axis represents the magnitude of the drive current I. In FIG. 10, the drive current I has a positive value when the second electrode 93 acts as the anode, whereas the drive current I has a negative value when the first electrode 92 acts as the anode.

The controller 40 may carry out a first-period DC control process, which is part of the first-period control process and in which the discharge lamp driver 230 is controlled to supply a DC current as the drive current I to the discharge lamp 90. In the first-period DC control process, the discharge lamp driver 230 may be controlled to supply the discharge lamp 90 with DC currents of opposite polarities as the drive current I, one in a first period and the other in the temporally next first period with a second period therebetween.

In the example shown in FIG. 10, the drive current I is a positive-polarity DC current in the first period from the time t1 to the time t3 and a negative-polarity DC current in the first period from the time t4 to the time t6. That is, in a first period and the temporally next first period (the first period from the time t1 to the time t3 and the first period from the time t4 to the time t6, for example) with a second period therebetween (the second period from the time t3 to the time t4, for example), the controller 40 controls the discharge lamp driver 230 to supply the discharge lamp 90 with DC currents of opposite polarities as the drive current I.

The first electrode 92 and the second electrode 93 of the discharge lamp 90 can thus receive thermal load in a symmetric manner, whereby the thermal load can be balanced between the first electrode 92 and the second electrode 93 of the discharge lamp 90. Unbalanced wear of the electrodes of the discharge lamp can therefore be suppressed.

In the above embodiment and variations, the description has been made with reference to a projector using three liquid crystal panels, but the invention is not limited thereto. The invention is also applicable to a projector using one liquid crystal panel, a projector using two liquid crystal panels, and a projector using four or more liquid crystal panels.

In the above embodiment and variations, the description has been made with reference to a transmissive projector, but the invention is not limited thereto. The invention is also applicable to a reflective projector. The word "transmissive" used herein means that a light modulation unit is a light-transmissive electro-optic modulator, such as a transmissive liquid crystal panel, and the word "reflective" used herein means that the light modulation unit is a light-reflective electro-optic modulator, such as reflective liquid crystal panel and a micromirror light modulator. For example, a DMD (digital micromirror device: a trademark of Texas Instruments Incorporated) can be used as the micromirror light modulator. When the invention is applied to a reflective projector, the same advantageous effects as those provided in a transmissive projector can also be provided.

The invention is applicable not only to a front projection projector that projects a projection image from the observation side but also to a rear projection projector that projects a projection image from the side opposite the observation side.

The invention is not limited to the embodiment described above, but a variety of variations can be implemented within a scope of the substance of the invention.

The scope of the invention encompasses substantially the same configurations as the configuration described in the above embodiment (for example, a configuration having the same function, using the same method, and providing the same result and a configuration having the same purpose and providing the same effect). Further, the scope of the invention encompasses a configuration in which an inessential portion of the configuration described in the above embodiment is replaced. Moreover, the scope of the invention encompasses a configuration that provides the same advantageous effect as that provided in the configuration described in the above embodiment or a configuration that can achieve the same purpose. Further, the scope of the invention encompasses a configuration in which a known technology is added to the configuration described in the above embodiment.

The entire disclosure of Japanese Patent Application No. 2010-179386, filed Aug. 10, 2010 is expressly incorporated by reference herein.

What is claimed is:

1. A projector configured to switch between a right-eye video image and a left-eye video image at predetermined switching timings to output the right-eye video image and the left-eye video image alternately, the projector comprising:
    a discharge lamp;
    a discharge lamp driver that supplies the discharge lamp with a drive current for driving the discharge lamp; and
    a controller that controls the discharge lamp driver,
    wherein a period sandwiched between temporally adjacent ones of the switching timings starts with a first period and ends with a second period,
    the first period starts with a third period and ends with a fourth period,
    the controller controls the discharge lamp driver in such a way that an absolute magnitude of the drive current in the first period is smaller than the absolute magnitude of the drive current in the second period,
    in the second period, the controller carries out a second-period AC control process in which the discharge lamp driver is controlled to supply an AC current as the drive current to the discharge lamp, and
    in the first period, the controller carries out a first-period control process in which the discharge lamp driver is so controlled that (1) in the third period, the absolute magnitude of the drive current becomes a minimum in the first period, (2) in the fourth period, the absolute magnitude of the drive current becomes an intermediate value between the minimum and a maximum absolute magnitude of the drive current in the second period, and (3) the third period and the fourth period each have a period where the drive current becomes constant direct current.

2. The projector according to claim 1,
    wherein the controller controls the discharge lamp driver in the first-period control process in such a way that the absolute magnitude of the drive current becomes the minimum at a start point of the third period.

3. The projector according to claim 1,
    wherein in the first-period control process, the controller carries out a first-period AC control process in which the discharge lamp driver is controlled to supply an AC current as the drive current to the discharge lamp.

4. The projector according to claim 3,
    wherein the controller controls the discharge lamp driver in the first-period AC control process to supply the discharge lamp with an AC current having a frequency higher than the frequency of the AC current in the second-period AC control process.

5. The projector according to claim 1,
    wherein the controller changes the absolute magnitude of the drive current in the first-period AC control process at a timing apart from a start point of the first period by an integral multiple of one cycle of the drive current.

6. The projector according to claim 1,
    wherein in the first-period control process, the controller carries out a first-period DC control process in which the discharge lamp driver is controlled to supply the discharge lamp with a DC current as the drive current, and
    in the first-period DC control process, the discharge lamp driver is controlled to supply the discharge lamp with DC currents having opposite polarities as the drive current, one in the first period and the other in the temporally next first period with the second period there between.

7. A projector configured to switch between a right-eye video image and a left-eye video image at predetermined switching timings to output the right-eye video image and the left-eye video image alternately, the projector comprising:
    a discharge lamp;
    a discharge lamp driver that supplies the discharge lamp with a drive current for driving the discharge lamp; and
    a controller that controls the discharge lamp driver,
    wherein a period sandwiched between temporally adjacent ones of the switching timings starts with a first period and ends with a second period,
    the first period starts with a third period and ends with a fourth period,
    the controller controls the discharge lamp driver in such a way that an absolute magnitude of the drive current in the first period is smaller than the absolute magnitude of the drive current in the second period,
    in the second period, the controller carries out a second-period AC control process in which the discharge lamp driver is controlled to supply an AC current having an AC current component only as the drive current to the discharge lamp, and
    in the first period, the controller carries out a first-period control process in which the discharge lamp driver is so controlled that in the third period, the absolute magnitude of the drive current becomes a minimum in the first period and in the fourth period, the absolute magnitude of the drive current becomes an intermediate value between the minimum and a maximum absolute magnitude of the drive current in the second period.

* * * * *